UNITED STATES PATENT OFFICE.

CLAYTON BEADLE, OF LONDON, ENGLAND.

TREATMENT OF CERTAIN PLANTS FOR PAPER-MAKING.

1,286,502. Specification of Letters Patent. Patented Dec. 3, 1918.

No Drawing. Application filed June 19, 1917. Serial No. 175,694.

*To all whom it may concern:*

Be it known that I, CLAYTON BEADLE, a subject of the King of Great Britain, residing in London, England, have invented a certain new and useful Treatment of Certain Plants for Paper-Making, of which the following is a specification.

For removing the incrusting and foreign substances and to assist the preparation of the individual fibers of paper making materials it is usual to employ a treatment with alkaline liquor in a closed boiling vessel under pressure in excess of atmospheric pressure and at a temperature above the boiling point, which process precedes the beating operation which has for its object the final preparation of the material in a beater or the like for the felting process. It has been suggested to combine the beating and boiling operations in a closed vessel while the materials are subject to increased pressure or diminished pressure.

In the few instances of suggested processes in which an open vessel has been used for the alkaline treatment, a boiling is prescribed. This is because for the production of a bleached material, which has always been the object, a boiling temperature and a fairly strong alkaline liquor are essential to attack constituents which would otherwise hinder bleaching or require wasteful consumption of bleaching liquor at the later stage.

I have discovered that many green crop plants, particularly when fresh cut, can be converted directly and rapidly, such as in the space of four hours, into stuff eminently fitted for making unbleached paper by subjecting the material to a process that leaves in the stuff the organic constituents, particularly parenchyma and similar cellular matter, which are usually chemically attacked by the chemicals used, and are washed away from the stuff. These constituents form a natural sizing material which makes the finished paper strong without further addition of a sizing material.

The invention consists in subjecting the green crop plant to a treatment with an alkaline liquor at atmospheric pressure at a temperature below the boiling point, while simultaneously disintegrating it into fibers by a beating operation, care being taken, by avoiding washing, to retain all the aforesaid organic constituents.

The kinds of plants that are capable of being treated by my process are those of a soft and yielding nature containing fibrous and other constituents sufficiently loosely attached to be capable of separation during beating if previously or simultaneously softened by contact with alkaline liquor, such as soda, at moderate temperatures. The action of the soda is limited as far as possible to a softening effect and without rendering the material soluble. At the same time the constituents so separated are simultaneously "hydrated" by the action of the soda so as to produce finished beaten stuff suitable for the production in many cases of strong self-colored papers such as kraft. Such papers are in notable cases self-sizing, and the pulp by reason of its swollen and absorbent nature is capable of retaining a large proportion of mineral matter. These qualities, which are rendered conspicuous by the employment of the process, are of marked commercial utility. There is the further advantage of increase of yield—thus, taking the case of *Hedychium coronarium*, when boiled under pressure in the ordinary way and subsequently beaten, it yields 60 per cent. of paper and when submitted to my treatment 90 per cent., showing an increase of 50 per cent. as a result of the soda not rendering the material soluble.

Many plants, the fibers of which have no value for paper making, can be reduced by the process. On the other hand, the invention is not applicable to all materials that are suitable for paper making. Thus, materials such as bamboo require more drastic boiling in closed boiling vessels or kiers as at present adopted; and the process is of no service in the treatment of pulp woods. Speaking generally, what may be called crop plants of a green and soft nature possessing at the same time valuable paper-making fiber are well suited for treatment by the invention. Examples of these are the varieties of *Hedychium*, particularly *Hedychium coronarium*, and many other members of the order *Zingiberaceæ* and also members of the order *Musaceæ* such as manila and banana plants.

Suitability appears to be connected with the power of the fibrous material to absorb alkali from the liquor at ordinary temperatures and it may be stated that a material found to have this property in a marked degree may be assumed to be one suitable for treatment by the invention. To test this property, some of the material is passed through crushing rollers, washed and dried and shaken with 20 times its weight of caustic soda solution of 0.25 per cent. concentration. After 4 hours contact in the cold, the fiber is squeezed out so as to retain twice its own weight of solution and the solution retained by the fiber analyzed for strength. As a rule the greater the soda concentration in the retained liquor, the more suitable the material for treatment by the process. *Hedychium coronarium* treated in this way showed a soda concentration in the retained liquor of 1.20 per cent, or nearly 5 times that of the original liquor. This may be taken as an example for purposes of comparison, but it is not pretended that this test is infallible.

As an example of the invention the treatment of *Hedychium coronarium* may be described. The stems, freshly cut, may be introduced, in suitably chopped condition, preferably in pieces one to four inches long, directly into the water in the beater. The beater roll is kept off the plate. The pieces of material being of suitable length are converted to the condition of stringy half stuff by once passing under the roll. The level of the water in the beater is kept as far as is practicable and caustic alkali is introduced—say 6 per cent. on the dry weight of the material, and the mass is heated in any suitable known manner. For green *Hedychium* 80° C. is a suitable temperature and the duration of heating may be from 2 to 4 hours.

Although there is advantage in economy of time in treating freshly cut green plants where the material is close at hand to the factory, the treatment is also applicable to plants that have been passed through crushing rollers and dried and otherwise prepared and dried for shipment. Generally, however, somewhat higher temperature and more alkali are desirable when dry plants are under treatment. In any case the temperature and time required must be regulated somewhat according to the nature of the raw material and the kind of paper to be produced. The action of the alkali must not proceed so far as to remove certain matters altered and softened by the alkali since these act as a natural sizing material. Indeed, by a mild treatment of *Hedychium*, a parchment-like grease-proof paper may be produced without any of the usual sizing materials.

When a fairly rough paper is to be made from a material like *Hedychium*, the chopped stems, after passing through crushing rollers to remove juices, when necessary, may be introduced direct into the hot alkaline liquor in the beater and the beating completed for the paper machine.

In such cases, as with *Hedychium*, when the alkali is not used in excess, it is neutralized or absorbed during its action on the *Hedychium*. If, on account of insufficient time being given, this neutralization does not occur in the beater, it will occur in the stuff chest into which the beaten st may be run directly from the beater and wherein it may be further heated if desired, but in the mass the material generally retains its heat for a sufficient time to obviate the necessity of further heat being applied. From the stuff chest the stuff may be passed through a refiner on its passage to the paper machine; *Hedychium* has been converted by the above-mentioned process from the freshly cut green stem to a finished paper in a period of four to five hours.

It is sometimes advantageous to allow action of the alkali to proceed at ordinary temperature before the heating operation in the beater—thus freshly chrushed *Hedychium* fiber may be saturated with alkaline liquor in the cold and kept for some weeks in this condition, whereafter it may be treated in the beater without further addition of alkali and with or without heating.

This procedure is useful in dealing with a tropical plant to be stored or for export. The roughly crushed and dried plant may be moistened with say its own weight of a 6 per cent. caustic soda solution and made up into bales in this condition. During transport the alkali does its work, becomes neutralized and on delivery the bales may be opened and charged directly into the beater.

As another example of the application of the invention the treatment of cotton separated from cotton seed hulls may be described. The material as received in bales, and to prevent it from blowing about, is preferably wetted by letting it stand in water to soak up sufficient moisture, and is then discharged into a beater or breaker and the extraneous insoluble matter, such as dust, is largely mechanically removed by washing with a washing drum. After washing, the alkali is added and the whole mass heated for a few hours, when the beater roll may with advantage be made to beat lightly the material. The heating is continued until the material is in a suitable condition for letting down into the stuff-chest.

To accelerate the action of the alkali I find it advantageous in some cases to add an excess of alkali and, after the material is sufficiently softened, to wash out the liquor into another beater, ready for treatment, adding to the second beater sufficient fresh alkali to make up for what is retained in the first beater, in which the softening action is completed, and to continue the process in this way. With many plants, however, quite small quantities of alkali only are needed and the alkali also is substantially neutralized by the time the beating operation is completed.

Having thus described the nature of the said invention and the best means I know of carrying the same into practical effect, I claim:—

1. A process for preparing certain fibrous materials for making unbleached paper, consisting in subjecting the material to a treatment with an alkaline liquor at atmospheric pressure and at a temperature below the boiling point while simultaneously disintegrating it into fibers by a beating operation, but so as to retain all the organic constituents commonly removed by a washing process.

2. A process for preparing certain fibrous materials for paper-making, consisting in moistening the material with an alkaline liquor, storing the moistened material and finally heating the moistened material at atmospheric pressure and at a temperature below the boiling point while it is being disintegrated in a beater.

3. In preparing certain fibrous materials for paper-making, the step which consists in moistening the material with an alkaline liquor and storing it in bales, such as during transport.

4. A process for preparing *Hedychium coronarium* for making unbleached paper, consisting in chopping the stems to form short pieces, introducing the pieces into a hot alkaline liquor, and agitating the mass until the material is ready for the paper machine.

5. As a new article of commerce a bale of fibrous material for paper-making, moistened with an alkaline liquor and stored, such as during transport.

In testimony whereof I have signed my name to this specification in the presence of the two subscribing witnesses.

CLAYTON BEADLE.

Witnesses:
  ALICE J. FLEMING,
  B. H. DERHAM.